US011518008B2

(12) United States Patent
McPhee (10) Patent No.: US 11,518,008 B2
(45) Date of Patent: Dec. 6, 2022

(54) APPARATUS FOR SIMULTANEOUSLY APPLYING TORQUE TO A PLURALITY OF JACKBOLTS OF A MULTI JACKBOLT TENSIONER

(71) Applicant: Superbolt, Inc., Carnegie, PA (US)

(72) Inventor: Andrew Duncan McPhee, Red Hill (AU)

(73) Assignee: Superbolt, Inc., Carnegie, PA (US)

( * ) Notice: Subject to any disclaimer, the term of this patent is extended or adjusted under 35 U.S.C. 154(b) by 322 days.

(21) Appl. No.: 16/759,708

(22) PCT Filed: Oct. 29, 2018

(86) PCT No.: PCT/US2018/057923
§ 371 (c)(1),
(2) Date: Apr. 27, 2020

(87) PCT Pub. No.: WO2019/089416
PCT Pub. Date: May 9, 2019

(65) Prior Publication Data
US 2020/0338699 A1    Oct. 29, 2020

Related U.S. Application Data

(60) Provisional application No. 62/580,288, filed on Nov. 1, 2017.

(51) Int. Cl.
*B25B 21/00* (2006.01)
*B23P 19/06* (2006.01)
(Continued)

(52) U.S. Cl.
CPC .......... *B25B 21/002* (2013.01); *B23P 19/069* (2013.01); *B25B 17/00* (2013.01); *F16B 31/04* (2013.01)

(58) Field of Classification Search
CPC ....... B25B 17/00; B25B 21/00; B25B 21/002; B25B 29/006; B23P 19/067; B23P 19/06; B23P 19/069; F16B 31/00; F16B 31/04
See application file for complete search history.

(56) References Cited

U.S. PATENT DOCUMENTS 2,583,140 A * 1/1952 Else .................... B66D 1/22
                                                    475/900
2,742,797 A * 4/1956 Perham ................ B25B 23/141
                                                    475/264
(Continued)

FOREIGN PATENT DOCUMENTS

CN        103286740        *   9/2013
CN        104858825 A          8/2015
(Continued)

OTHER PUBLICATIONS

European Search Report issued for European Application No. 18874679.6, dated Nov. 17, 2020 in 8 pages.
(Continued)

*Primary Examiner* — Robert J Scruggs
(74) *Attorney, Agent, or Firm* — Knobbe, Martens, Olson & Bear, LLP (57) ABSTRACT

A tensioning apparatus is adapted to simultaneously tension a number of jackbolts of a multi jackbolt tensioner. The tensioning apparatus may be made compact by overlapping gear disks of the spindle gears and further act as a torque multiplier between the other gears of the tensioning apparatus. The tensioning apparatus can be part of a combination with a power transfer assembly.

14 Claims, 8 Drawing Sheets

(51) Int. Cl.
*B25B 17/00* (2006.01)
*F16B 31/04* (2006.01)

(56) References Cited

U.S. PATENT DOCUMENTS

| | | | |
|---|---|---|---|
| 3,134,275 A | | 5/1964 | Davison |
| 3,472,083 A | * | 10/1969 | Schnepel ................ B25B 17/00 |
| | | | 74/606 R |
| 3,905,429 A | * | 9/1975 | Berger .................... B25B 21/00 |
| | | | 81/57.13 |
| 5,277,085 A | * | 1/1994 | Tanimura ............. B23P 19/069 |
| | | | 81/57.24 |
| 2002/0117027 A1 | * | 8/2002 | Boston .................. B60B 29/002 |
| | | | 81/57.22 |
| 2003/0226427 A1 | | 12/2003 | Rosetto |
| 2014/0245869 A1 | * | 9/2014 | Rice ..................... B23P 19/069 |
| | | | 81/473 |

FOREIGN PATENT DOCUMENTS

| | | |
|---|---|---|
| CN | 204976638 U | 1/2016 |
| CN | 106451908 A | 2/2017 |
| CN | 206185811 U | 5/2017 |
| CN | 103286740 * | 9/2019 |
| JP | 3313923 B2 | 8/2002 |
| WO | 2016141407 A1 | 9/2016 |
| WO | 2017118960 A1 | 7/2017 |

OTHER PUBLICATIONS

Chinese Office Action issued for Chinese Patent Application No. 201880072385.9, dated Apr. 2, 2021 in 9 pages.
International Search Report for Application No. PCT/US2018/057923, dated Feb. 11, 2019 in 5 pages.
Written Opinion for PCT Application No. PCT/US2018/057923, dated Feb. 11, 2019 in 4 pages.

* cited by examiner

- Prior Art -

FIG. 1

- Prior Art -

APPARATUS FOR SIMULTANEOUSLY APPLYING TORQUE TO A PLURALITY OF JACKBOLTS OF A MULTI JACKBOLT TENSIONER

CROSS-REFERENCE TO RELATED APPLICATIONS

This application is the U.S. National Phase under 35. U.S.C. § 371 of International Application PCT/US2018/057923, filed Oct. 29, 2018, which claims the benefit of U.S. Provisional Application No. 62/580,288, filed Nov. 1, 2017. The disclosures of the above-described applications are hereby incorporated by reference in their entirety.

BACKGROUND

A Multi-Jackbolt Tensioner (MJT), such as the tensioner sold under the Superbolt® brand, is generally used as a direct replacement for hex nuts, covered nuts, bolts, etc. of a size typically of 1" or greater. A conventional (nut based) MJT threads onto an existing bolt or stud providing a highly effective means to "bolt up the joint". The typical MJT consist of three components, i) a hardened washer to provide a hardened, flat surface for the jackbolts to "push" against; ii) an often round nut body that threads onto the existing bolt or stud and seats hand tight against the washer initially; and iii) a polar array of jackbolts that thread through the nut body so that their points force against the washer to pre-tension the bolt or stud.

Figure 1:
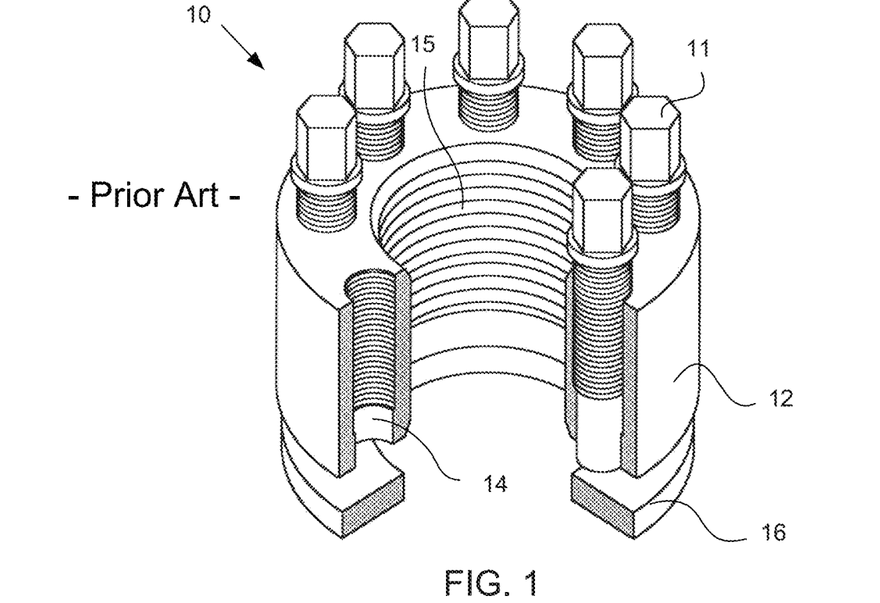
FIG. 1 is a partially cut-away view of an exemplary multi-jackbolt tensioner (MJT).

FIG. 1 is a partially cutaway version of an exemplary nut-style MJT 10. The MJT 10 comprises an annular body 12. The body 12 of the MJT 10 is formed with a threaded central hole 15 to receive a bolt, shaft, or stud. A polar array of threaded jack bolt holes 11, each disposed on a circle concentric with the central hole, pass though the body 12. Corresponding jack bolts 11 traverse the jack bolt holes 14 and are threadedly received therein. The MJT 10 further includes a load bearing member in the form of a hardened washer 16 against which points of the jack bolts 11 abut in use. The hardened washer 16 bears against a workpiece being fastened.

Figure 2:
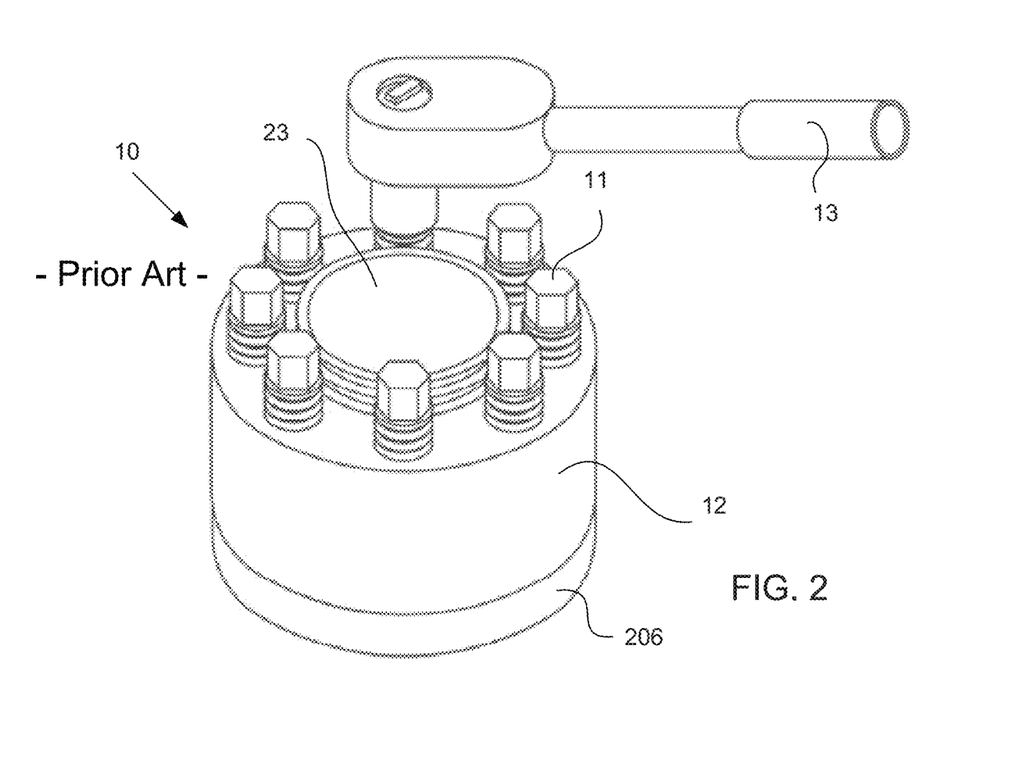
FIG. 2 shows the MJT of FIG. 1 in use being tensioned by means of a torque wrench.

In use, as shown in FIG. 2, the washer 16 is placed over a stud 23 and the body 12 of the MJT is threaded thereon. All of the jack bolts 11 are uniformly and evenly tightened with a torque wrench 13 in two to five passes of an alternating "star pattern" around the jack bolts so that all of the jack bolts 11 are incrementally tightened so that at any one time there is no substantial imbalance of tension between them.

As an alternative to the nut-style MJT 10 of FIG. 1, bolt-style MJTs are also known. A bolt-style MJT generally comprises a body having a threaded shaft that may be used for blind tapped holes and counterbores. MJTs are commercially available from Superbolt, Carnegie Pa. Further discussions of MJTs may be found in U.S. Pat. Nos. 4,622,730, RE33,490, 4,927,305, 5,075,950, 5,083,889 and 6,112,396, which are incorporated herein by reference.

MJTs have addressed some significant problems from the past. However, the use of MJTs has given rise to some other problems which need to be addressed. Specifically, each jackbolt of the MJT must be separately tightened. Some industrial applications require implementation of multiple MJTs and in such applications, the tightening of each jackbolt can become time consuming. Typically, the tightening of jackbolts involves the use of a wrench or a hand held tool with a socket whereby each jackbolt needs to be individually tightened.

In U.S. Pat. No. 9,573,231 by David Rice, there is disclosed a handheld apparatus for simultaneously tensioning multiple jackbolts of an MJT. However, it is believed that whilst the apparatus that is described in the '231 patent would be suitable for tightening small jackbolts it would not be suitable for tightening large jackbolts unless made so large that it would be difficult for an operator to carry. Furthermore, it is believed that the '231 apparatus may be unable to provide sufficient torque to suitably tension larger jackbolts.

In daily use an operator may need to tighten many MJTs and travel between them carrying the tensioning device. Therefore, it is preferable that the tensioning apparatus be compact while still being able to impart torque uniformly to the jackbolts.

Accordingly, there is a need to provide an improved tensioning apparatus that can simultaneously tension jackbolts of an MJT and which is of a compact design.

SUMMARY OF THE INVENTION

According to a first aspect of the present invention there is provided a tensioning apparatus arranged to simultaneously tension a plurality of jackbolts of a multi jackbolt tensioner, the tensioning apparatus comprising:
a housing arranged for receiving a drive gear;
one or more planetary gears retained within the housing for meshing with the drive gear;
a ring gear encircling the one or more planetary gears and meshing therewith;
a plurality of spindle gears retained in the housing, the spindle gears including spindles for coupling to said jackbolts, the spindle gears being disposed about the ring gear and meshed with an outside thereof;
whereby in use the drive gear rotates the one or more planetary gears to thereby rotate the spindle gears via the ring gear to thereby tension the jackbolts.

In a preferred embodiment of the invention the planetary gears are part of a planetary gear assembly further comprising a carrier for said gears that locates within the housing. The planetary gears preferably each have axles. Preferably the planetary gear assembly comprises a base plate and a top plate between which the axles of the planetary gears are journaled.

It is preferred that one or more supports extend between the base plate and the top plate. In a preferred embodiment of the invention the one or more supports alternate between the one or more planetary gears. The supports may be formed with arcuate cut-outs shaped to complement peripheral portions of the planetary gears.

In a preferred embodiment of the invention the housing is formed of first and second parts which define a space therebetween in which the planetary gear assembly, the gear ring and the spindle gears are located.

In the preferred embodiment of the invention spindles of the spindle gears are journaled between the first and second parts of the housing wherein ends of the spindles extend beyond the second part of the housing.

The gear portions of adjacent spindle gears may be axially offset to so that portions of adjacent spindle gears can overlap to thereby reduce angular separation between said gears. For example, gear portions of the adjacent spindle gears may be axially offset at two or more levels.

In a preferred embodiment of the invention gear portions of the spindle gears are offset at one of three levels.

Preferably the first part of the housing is formed with a hole for receiving the planetary gear assembly therein. Preferably the second part of the housing is formed with an internal recess for registering with the top plate of the planetary gear assembly. The top plate of the planetary gear assembly is preferably fastened in the recess to the second part of the housing.

According to a further aspect of the present invention there is provided a tensioning apparatus as previously discussed in combination with a power transfer assembly including a worm drive, rotatable by drive unit such as a motor, and a gear wheel meshed with the worm drive.

Preferably the power transfer assembly includes an output shaft coaxial with the gear wheel and including a first end comprising the drive gear.

In the preferred embodiment of the invention the output shaft includes a second end comprising a further drive gear wherein the drive gear and the further drive gear are located on opposite sides of the gear wheel.

The worm drive may be unidirectional wherein coupling of the tensioning apparatus to the drive gear causes rotation of the spindles in a first direction and wherein coupling of the tensioning apparatus to the further drive gear at the opposite end of the output shaft causes rotation of the spindles in a second direction that is opposite the first direction for respectively tightening and loosening jackbolts.

Preferably the power transfer assembly includes first and second opposed sides disposed on opposite sides of the gear wheel through which the first and second ends of the drive gear extend.

The first and second opposed sides are preferably formed to register with the first part of the housing of the tensioning apparatus.

BRIEF DESCRIPTION OF THE DRAWINGS

In order that this invention may be more readily understood and put into practical effect, reference will now be made to the accompanying drawings which illustrate a preferred embodiment of the invention and wherein.

DETAILED DESCRIPTION

FIGS. 3 to 8 comprise various views of a tensioning apparatus 200 for simultaneously tensioning jackbolts of an MJT according to a preferred embodiment of the present invention.

Figure 3:
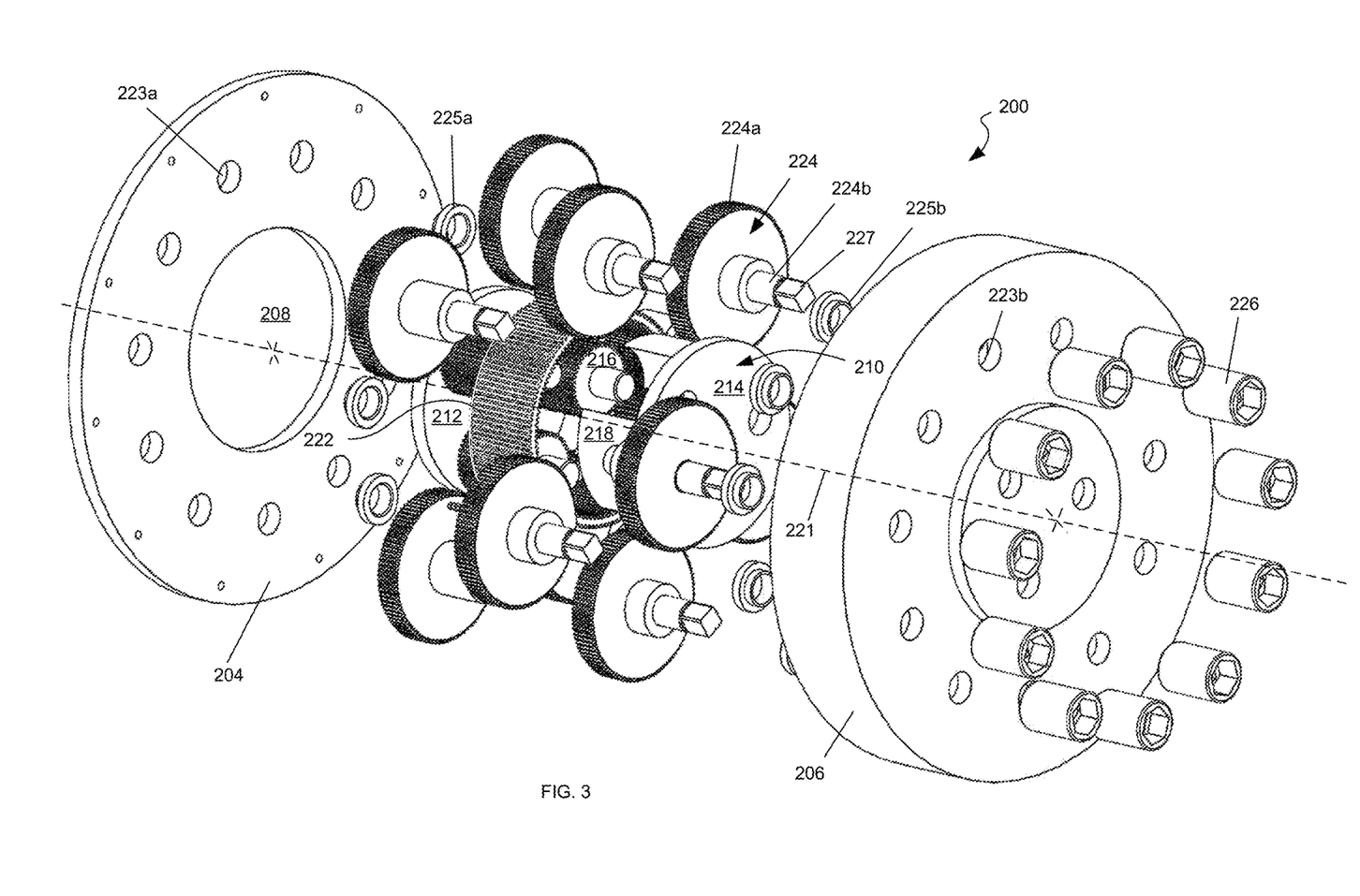
FIG. 3 is an exploded view of a tensioning apparatus for MJTs according to a preferred embodiment of the present invention.
Figure 4:
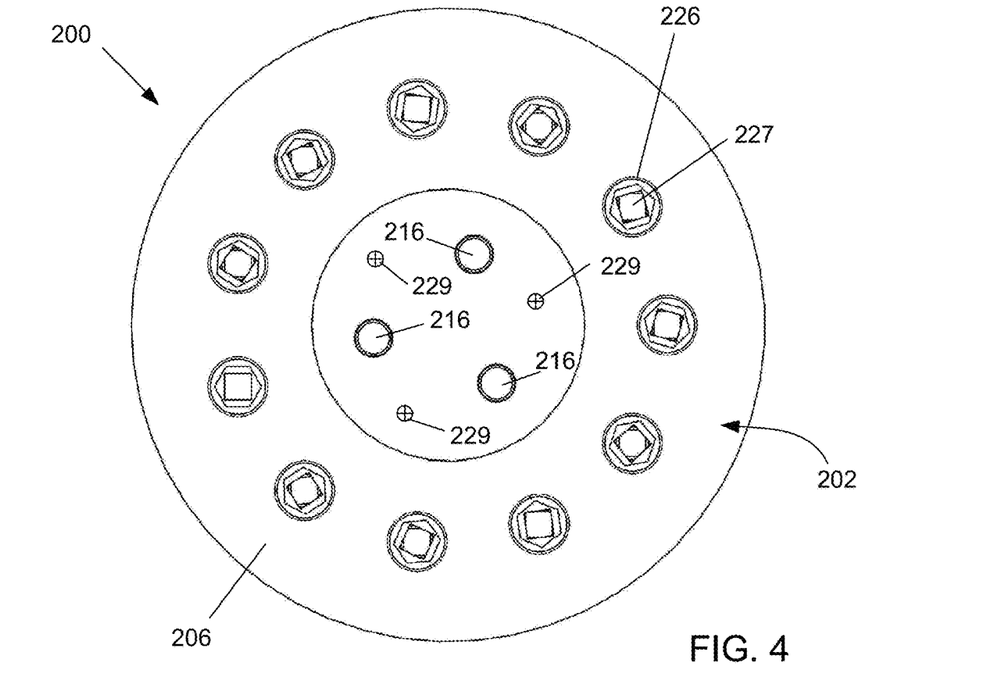
FIG. 4 is a top view of the tensioning apparatus.
Figure 5:
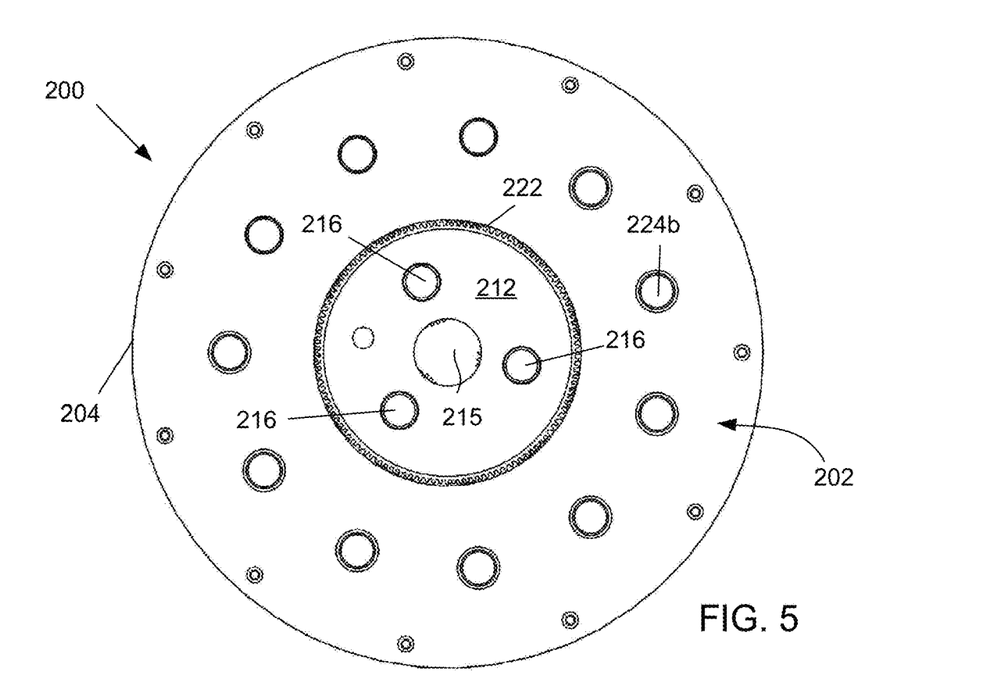
FIG. 5 is a bottom view of the tensioning apparatus.
Figure 6:
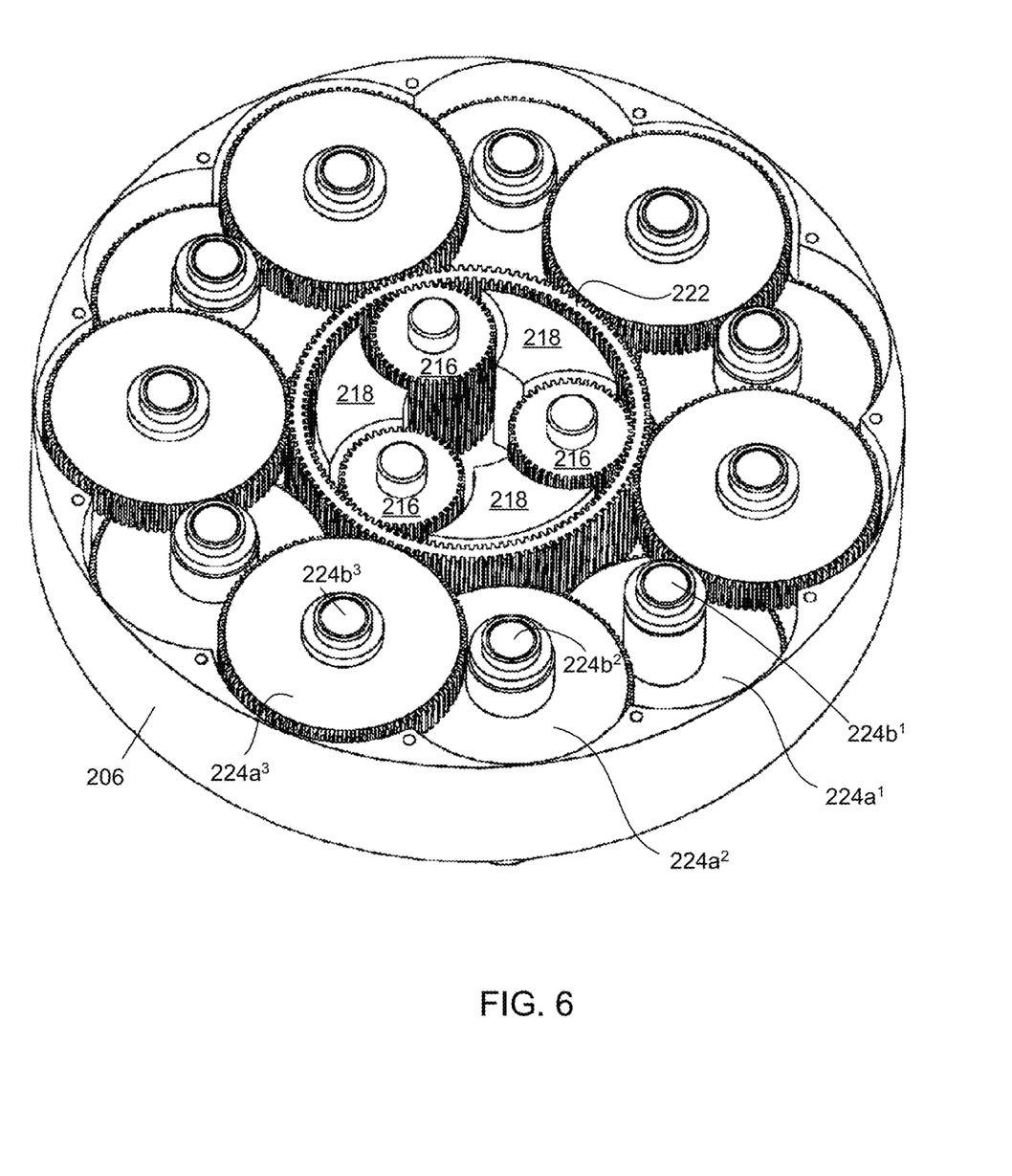
FIG. 6 is a view of the bottom of the tensioning apparatus with back plate removed.
Figure 7:
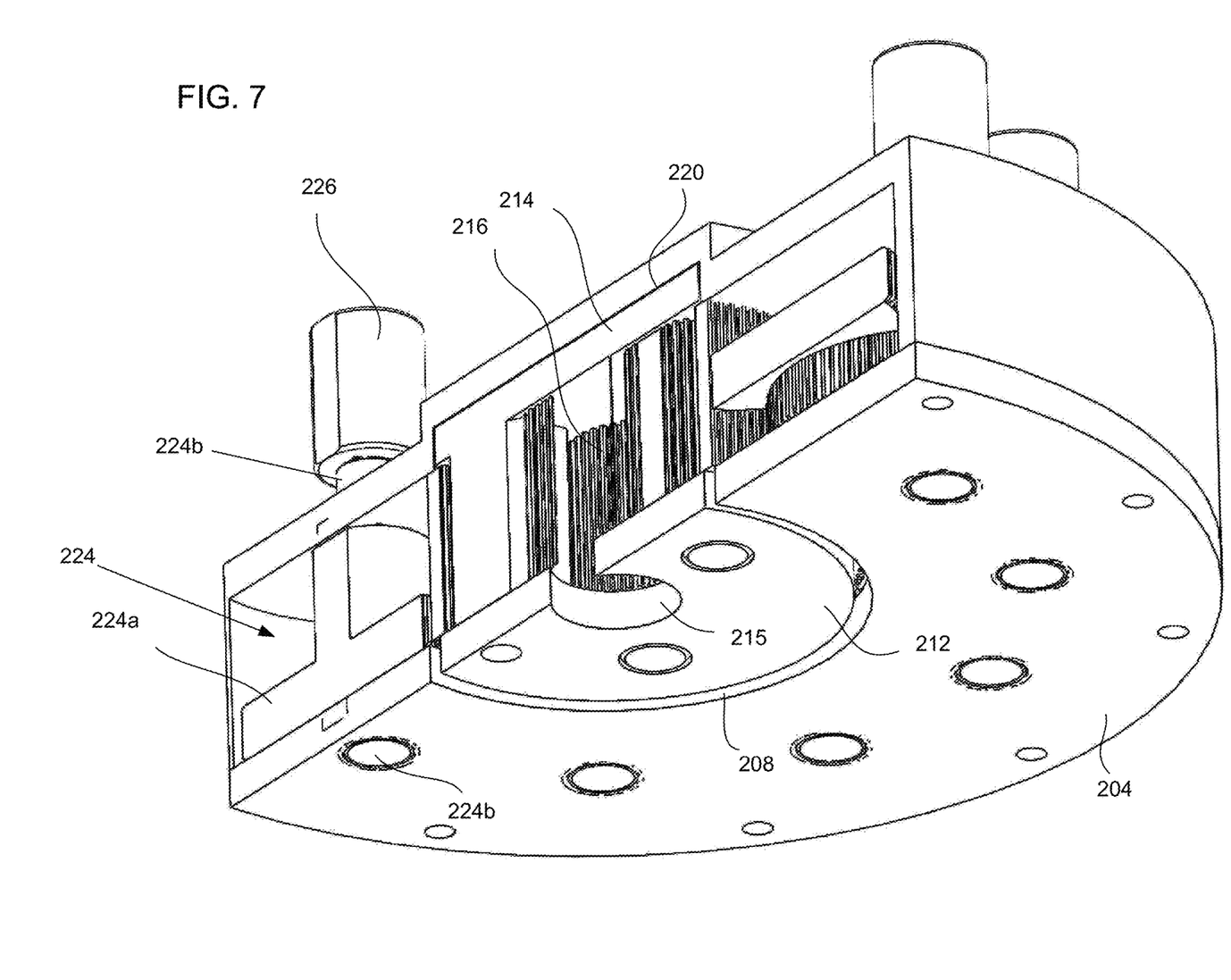
FIG. 7 is a view of the tensioning apparatus cross sectioned through a first plane.
Figure 8:
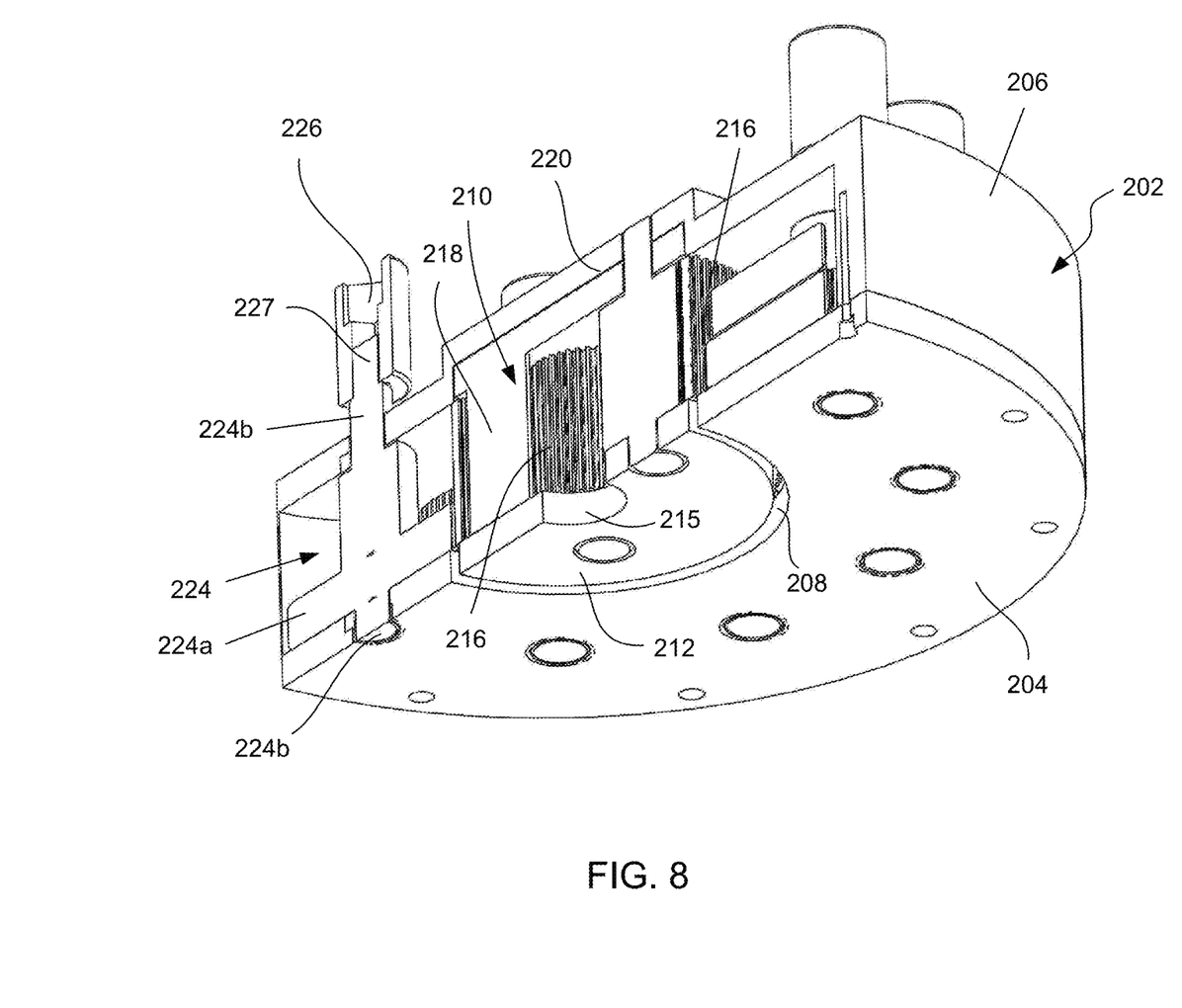
FIG. 8 is a view of the tensioning apparatus cross sectioned through a second plane.

The tensioning apparatus 200 includes a housing 202 that is comprised of a first portion being a back plate 204, and a second portion being a cover 206, which fasten together to define an internal space. The back plate 204 is formed as an annulus with a central circular hole 208. In the presently described embodiment the housing presents as squat cylinder with a longitudinal axis 221. It will be realised that in other embodiments the housing 202 may be of a different shape.

A planetary gear assembly (PGA) 210 is located coaxially within the housing 202. The planetary gear assembly comprises a bottom plate 212 and a top plate 214. Three planetary gears 216 are journaled between the bottom plate 212 and the top plate 214. The planetary gears are equiangularly disposed around the central axis 221 of the housing at 120 degrees. Supports 218 are fastened between the base plate and the top plate and are disposed alternately between the planetary gears 216. The supports are formed with arcuate concave sides shaped to complement peripheral portions of the planetary gears 216.

The cover 206 of the housing 202 is internally formed with a central, circular recess 220 (identified in FIGS. 7, 8) opposite the back plate centre hole 208 for registering with the top plate 214 of the planetary gear assembly 210. The top plate 214 is then fastened to the cover by means of suitable bolts 229 (identified in FIG. 4 only) so that the top plate 214 and thus the planetary gear assembly (PGA) 210 is fast with the housing 202.

A ring gear 222 encircles the planetary gears 216. The ring gear 222 is toothed on its inside wall and also on its outside wall. The inside wall of the ring gear 222 meshes with each of the planetary gears 216.

A plurality of spindle gears 224 are retained in the housing 202 equi-angularly and located at a common radial distance from axis 221. The spindle gears 224 are disposed about the ring gear 222 and mesh with its outside wall. Each spindle gear 224 is comprised of a gear disk 224*a*, i.e. a disk with toothed periphery, and a spindle 224*b* that extends coaxially from the gear disk.

In the preferred embodiment of the invention that is illustrated herein, the spindles 224*b* of the spindle gears 224 are journaled between the back plate 204 and the cover 206 of the housing 202 by means of corresponding holes and bearings 223*a*, 225*a* and 223*b*, 225*b* of the base plate 208 and the cover 206. The cover end of each of the spindles 224*b* extends beyond the cover 206 of the housing 202 and terminates in a square cross section 227 for receiving a coupling socket 226. It will be observed that the gear disks 224*a* of adjacent spindle gears 224 are axially offset so that adjacent gear disks are overlapped. Overlapping of the adjacent spindle gears 224 allows for the angular separation between them to coincide with the positions of jackbolts on an intended MJT for tensioning. For example, it may be seen in FIG. 6 that the gear disks 224*a*1, 224*a*2 and 224*a*3 of three adjacent spindle gears are axially offset through three levels. This is possible due to the height of the ring gear 222 being about three times greater than the height of each of the gear disks 224*a* so that each gear disk is able to mesh with the ring gear at one of the three different levels. Depending on the number of spindle gears 224 that must be located around the axis of the tensioning unit, the number of levels that are required may be increased or decreased.

In the presently described embodiment the ratio of gear diameters from each planetary gear to the ring gear to each spindle gear results in an overall speed reduction, from the planetary gears to the spindle gears, of 2:1 and a torque multiplication of about 1:2 so that the delivered torque is approximately doubled.

Figure 9:
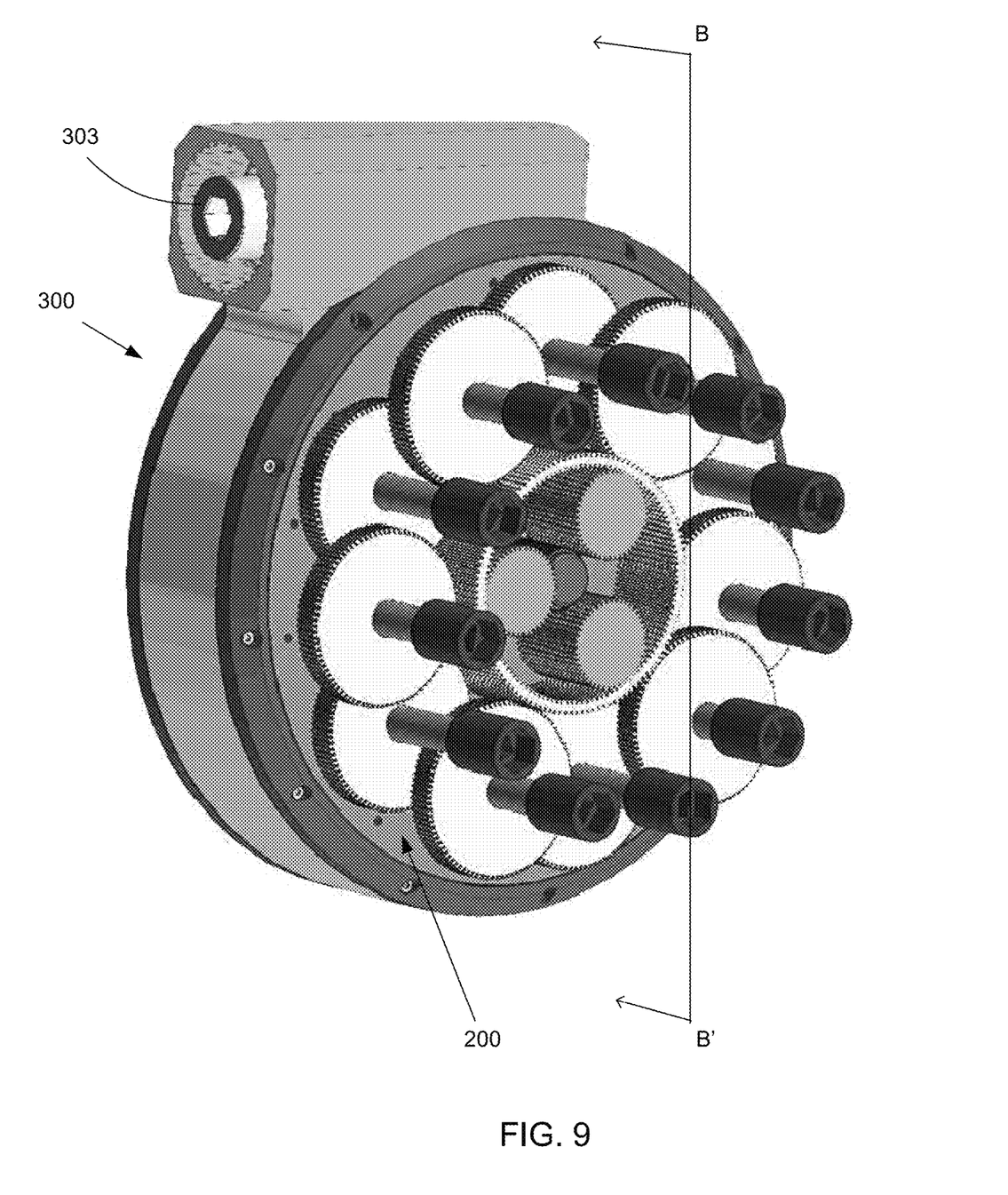
FIG. 9 shows the tensioning apparatus with cover removed, mounted to a power transfer unit.
Figure 10:
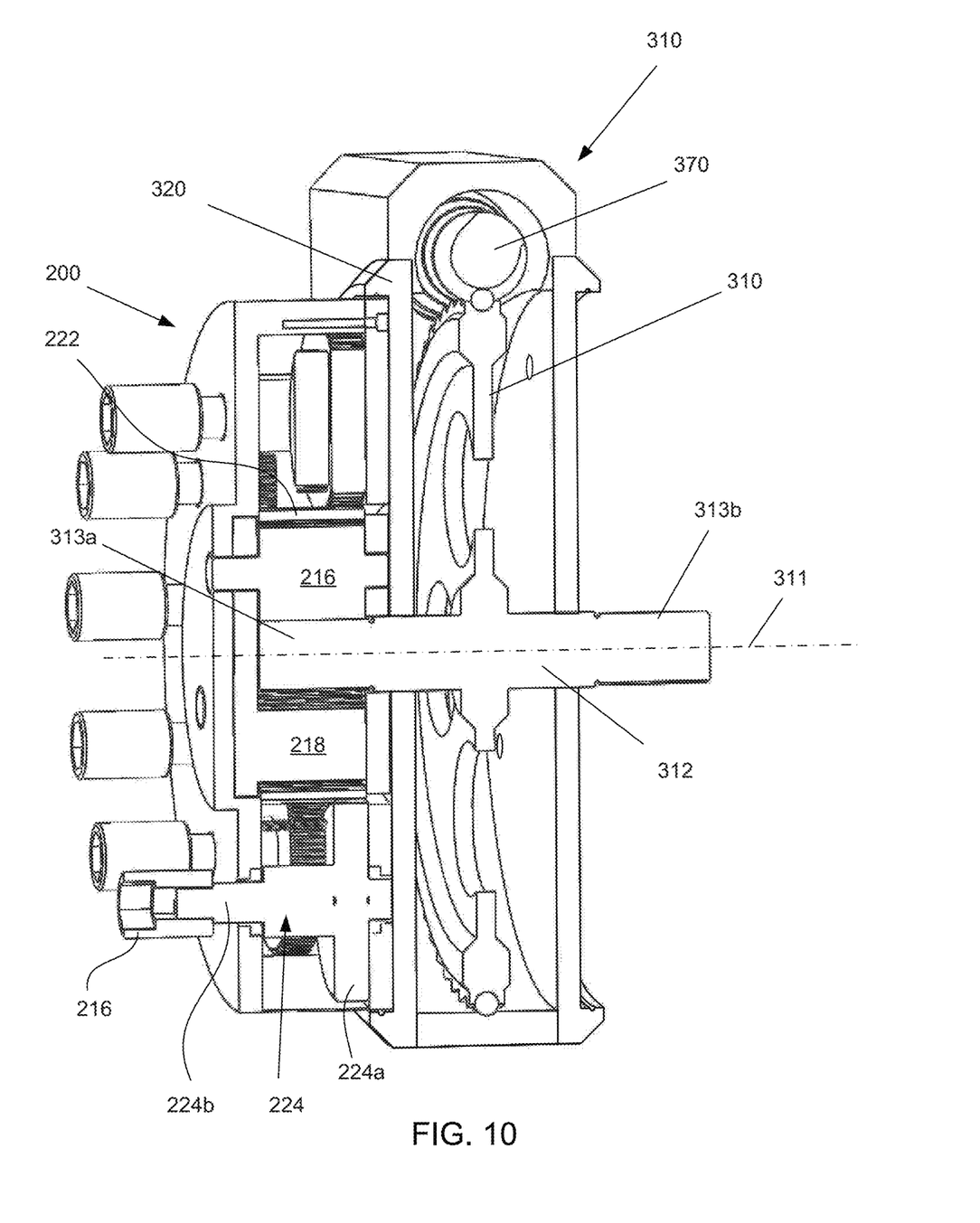
FIG. 10 is a cross sectional view of the tensioning apparatus mounted to the power transfer unit.

FIG. 9 shows the tensioning apparatus 200, with cover 206 removed, mounted to a power transfer assembly 300. The power transfer assembly 300 comprises a transmission between a drive, such as an electric, pneumatic or hydraulic motor, and the tensioning apparatus 200. FIG. 10 is a cross sectional view in the direction indicated through cross section B-B' of FIG. 9, of the tensioning apparatus 200 mounted to the power transfer assembly 300. As can be seen in FIG. 10, the power transfer assembly 300 includes a worm 370 that meshes with a worm wheel 310. A preferred worm and worm wheel arrangement which is specifically designed for high torque transfer is discussed in international patent publication No. WO 2016/141407 in the name of Nord-Lock Australia Pty Ltd, the content of which is hereby incorporated by reference. In use the worm 370 is coupled to a shaft of the motor by means of connector 303 (FIG. 9). The drive assembly, for example the motor, is typically provided with an output shaft including a standard, typically square, end that is designed to be inserted into a socket such as connector 303 of the power transfer assembly 300.

The central worm wheel 310 is journaled in the power transfer assembly housing 320 along a central drive gear axis 311. The central drive gear axis defines a longitudinal axis for the power transfer assembly 300. The power transfer assembly housing has first and second opposed sides of disposed on opposite sides of the gear wheel through which the first and second ends of the drive gear extend. It will be observed in FIG. 9 that the first and second opposed sides are formed with a peripheral lip that defines a recess for registering with the first part of the housing of the tensioning apparatus.

The worm wheel 310 comprises an outwardly extending shaft 312, with ends that terminate in drive gears 313a and 313b. Each drive gear 313a, 313b is adapted to be coupled with the tensioning apparatus 200. The drive gear, either 313a or 313b passes through a coaxial central hole 215 (FIG. 5) in PGA-bottom plate 212 in order to mesh with the planetary gears 216.

Accordingly, assuming that the worm 370 is always driven in a single direction, coupling the tensioning apparatus 200 to drive gear 313a drives the spindles 224b, and thus coupling sockets 226, in a first direction for tightening jackbolts, whereas coupling the tensioning apparatus 200 to drive gear 313b drives the spindles in a second direction for loosening jackbolts.

In use, in order to tension the jackbolts of a MJT, the tensioning apparatus 200 is firstly mounted to the power transfer assembly 300 so that drive gear 313a is inserted into the tensioning apparatus and meshes with each of the three planetary gears 216. The spindles 224b of the tensioning apparatus 200 are then aligned with the jackbolts of the MJT and coupled thereto by means of coupling sockets 226. A power source, such as an electric or pneumatic motor is then coupled to the input socket 303 of the power transfer assembly 300. Operation of the power source causes the worm 370 and thus the wormwheel 310 of the power transfer assembly 300 to rotate thereby rotating the drive gear 313a. Consequently each of the planetary gears 216 rotates thereby causing the ring gear 222 to rotate. The rotation of the ring gear 222 in turn causes each of the spindle gears 224 to rotate. As the spindle gears 224 rotate so to do their spindles 224b and thus the attached coupling sockets 226 thereby imparting torque to each of the jackbolts of the MJT and thus causing them to rotate and tension.

When it is desired to loosen jackbolts of an MJT an analogous process is carried out except that the tensioning apparatus 200 is coupled to the reverse side of the power transfer assembly 300. In this configuration drive gear 313b (as opposed to 313a) meshes with each of the planetary gears 216, thereby causing rotation in an opposite direction of the spindle gears and loosening of the jackbolts.

If necessary, for example for servicing, the planetary gear assembly 210 may be removed through the base plate 208 once the top plate 214 has been unbolted from the cover 206. The planetary gear assembly can then be quickly replaced with a functioning unit without having to disassembly the entire unit. The ring gear 222 is retained in its position by virtue of it meshing with the spindle gears 224 and the planetary gears 216. Parts internal to the housing 202 are packed with grease for lubrication.

While the specific embodiment of the invention that has been described herein has eleven spindle gears and thus is specifically designed for tightening a MJT having eleven jackbolts, it will be realised that variations of the invention with fewer or more spindle gears are possible to suit MJTs with a fewer or greater number of jackbolts.

All documents cited herein are incorporated herein by reference, but only to the extent that the incorporated material does not conflict with existing definitions, statements, or other documents set forth herein.

To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions.

This application including the appended claims is therefore intended to cover all such changes and modifications that are within the scope of this application.

What is claimed is:

1. A combination comprising a tensioning apparatus arranged to simultaneously tension a plurality of jackbolts of a multi jackbolt tensioner and a power transfer assembly,
   wherein the tensioning apparatus comprises:
      a housing arranged for receiving a drive gear;
      one or more planetary gears retained within the housing for meshing with the drive gear;
      a ring gear encircling the one or more planetary gears and meshing therewith;

a plurality of spindle gears retained in the housing, each spindle gear including a spindle for coupling to said jackbolts, the spindle gears being disposed about the ring gear and meshed with an outside thereof;

wherein, in use, the drive gear rotates the one or more planetary gears to rotate the spindle gears via the ring gear to thereby tension the jackbolts, and wherein the power transfer assembly comprises:
a worm drive rotatable by a motor;
a gear wheel meshed therewith, and
an output shaft coaxial with the gear wheel including a first end comprising the drive gear,
wherein the output shaft includes a second end comprising a further drive gear wherein the drive gear and the further drive gear are located on opposite sides of the gear wheel.

2. The combination according to claim 1, wherein the planetary gears are part of a planetary gear assembly.

3. The combination according to claim 2, wherein the planetary gear assembly comprises a base plate and a top plate between which axles of the planetary gears are journaled.

4. The combination according to claim 3, wherein one or more supports extend between the base plate and the top plate and are located between the one or more planetary gears.

5. The combination according to claim 4, wherein the supports are formed with arcuate cut-outs shaped to complement peripheral portions of the planetary gears.

6. The combination according to claim 2, wherein the housing is formed of first and second parts which define a space therebetween in which the planetary gear assembly, the gear ring and the spindle gears are located.

7. The combination according to claim 6, wherein spindles of the spindle gears are journaled between the first and second parts of the housing.

8. The combination according to claim 6, wherein the first part is formed with a hole for receiving the planetary gear assembly therein.

9. The combination according to claim 8, wherein the second part is formed with an internal recess for registering with a top plate of the planetary gear assembly.

10. The combination according to claim 1, wherein adjacent spindle gears are axially offset with portions of adjacent spindle gears overlapping to thereby reduce angular separation between said gears.

11. The combination according to claim 10, wherein gear portions of the
spindle gears are offset at one of three levels.

12. The combination of claim 1, wherein the worm drive is unidirectional and wherein coupling of the tensioning apparatus to the drive gear causes rotation of the spindles in a first direction and wherein coupling of the tensioning apparatus to the further drive gear causes rotation of the spindles in a second direction opposite the first direction.

13. The combination of claim 1, wherein the power transfer assembly has first and second opposed sides disposed on opposite sides of the gear wheel through which the first and second ends of the drive gear extend.

14. The combination of claim 13 wherein the first and second opposed sides are formed with a recess for registering with the first part of the housing of the tensioning apparatus.

* * * * *